United States Patent [19]

Swan, Jr.

[11] 4,229,546
[45] Oct. 21, 1980

[54] VISCOUS, FLOWABLE, PRESSURE-COMPENSATING FITTING COMPOSITIONS HAVING THEREIN BOTH GLASS AND RESINOUS MICROBEADS

[75] Inventor: Jack C. Swan, Jr., Boulder, Colo.

[73] Assignee: Hanson Industries Incorporated, Boulder, Colo.

[21] Appl. No.: 928,563

[22] Filed: Jul. 27, 1978

Related U.S. Application Data

[60] Division of Ser. No. 882,644, Mar. 2, 1978, which is a continuation-in-part of Ser. No. 723,912, Sep. 16, 1976, Pat. No. 4,108,928, which is a continuation-in-part of Ser. No. 663,213, Mar. 2, 1976, abandoned.

[51] Int. Cl.³ .......................... C08J 9/32; C08L 91/06
[52] U.S. Cl. ..................................... 521/55; 106/272; 36/71; 36/93
[58] Field of Search .................. 106/122, 272; 521/54, 521/55; 36/71, 93

[56] References Cited

U.S. PATENT DOCUMENTS

| | | | |
|---|---|---|---|
| 2,797,201 | 6/1957 | Veatch et al. | 106/288 B |
| 3,407,406 | 10/1968 | Werner et al. | 36/71 |
| 3,582,503 | 6/1971 | Horne | 106/288 B |
| 3,607,332 | 9/1971 | Wingfield | 106/243 |
| 3,615,972 | 10/1971 | Morehouse, Jr. | 156/79 |
| 3,635,849 | 1/1972 | Hanson | 128/595 |
| 3,822,138 | 7/1974 | Noguchi et al. | 106/38.8 |
| 3,882,561 | 5/1975 | Hanson et al. | 12/142 P |

Primary Examiner—Theodore Morris
Attorney, Agent, or Firm—Merriam, Marshall & Bicknell

[57] ABSTRACT

Viscous, flowable, pressure-compensating fitting materials or compositions having low density, sturdy, glass microbeads and lightweight, sturdy resinous microbeads substantially uniformly distributed therein, which are suitable for a variety of uses and applications, including, but not limited to, fitting pads for footwear or the like.

39 Claims, 5 Drawing Figures

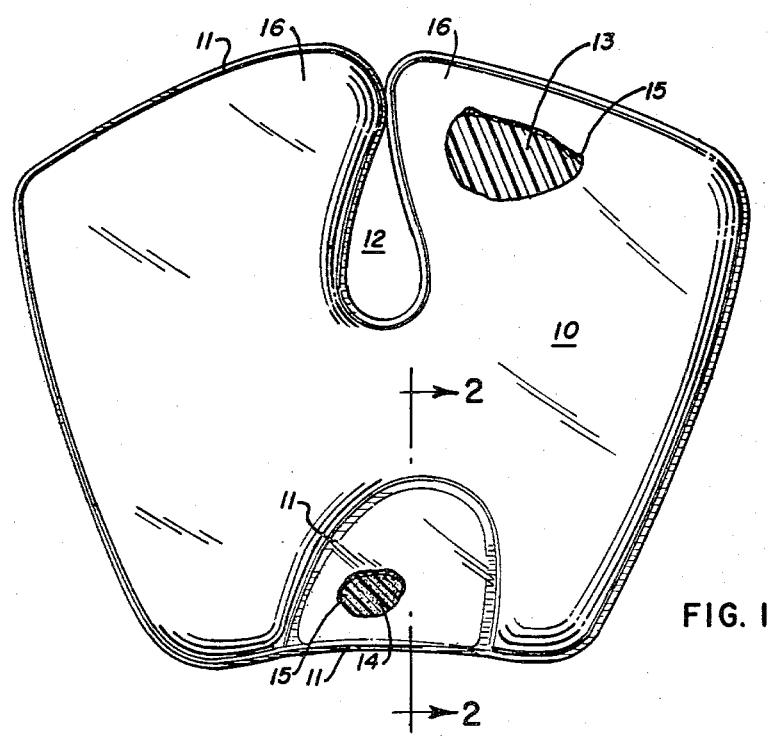
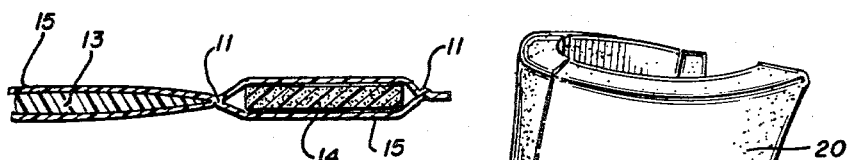
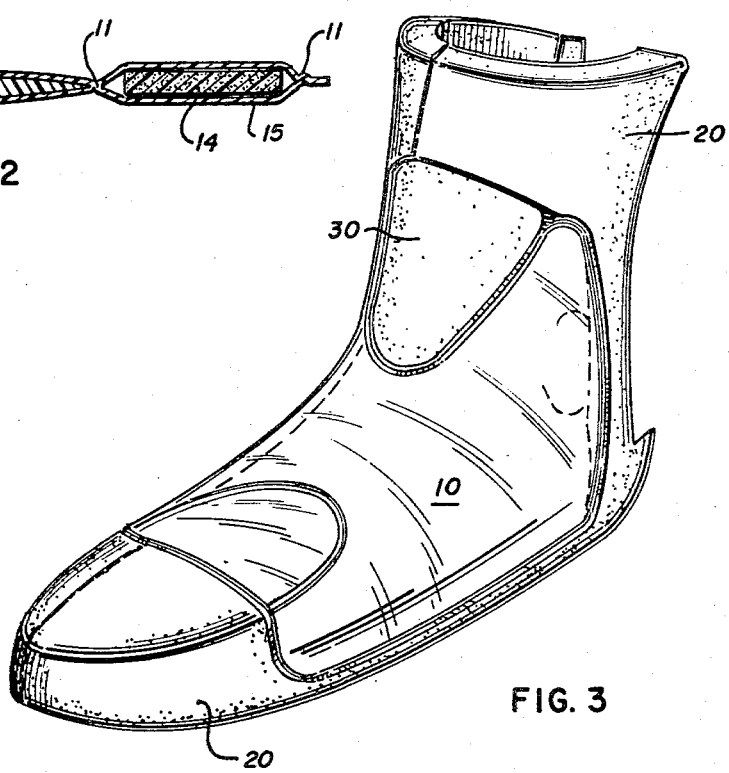
FIG. 1
FIG. 2
FIG. 3

VISCOUS, FLOWABLE, PRESSURE-COMPENSATING FITTING COMPOSITIONS HAVING THEREIN BOTH GLASS AND RESINOUS MICROBEADS

This application is a division of application Ser. No. 882,644, filed Mar. 2, 1978, which is a continuation-in-part of my pending application Ser. No. 723,912, filed Sept. 16, 1976, now U.S. Pat. No. 4,108,928 which, in turn, is a continuation-in-part of my application Ser. No. 663,213, filed Mar. 2, 1976 and now abandoned.

The present invention relates to viscous, flowable, pressure-compensating fitting materials or compositions having sturdy, low density or density-reducing [based on the overall density of the fitting material and as compared with the density of other components(s)], glass microbeads and resin microbeads distributed therein, which are suitable for a variety of uses and applications. For example, such pressure-compensating fitting materials or compositions may be retained within or by flexible enclosures to provide fitting pads, including adjustable fitting pads such as disclosed in application Ser. No. 778,828 of Chris A. Hanson, filed Mar. 17, 1977, and issued on Apr. 11, 1978 as U.S. Pat. No. 4,083,127, and, if desired, may be used either with or without such enclosures in conjunction with (1) footwear, including boots (e.g., ski boots), (b) hand grips, (c) cushioning structures, including devices or appliances which provide protection to parts of the body by cushioning against pressure, impact or shock, including athletic and safety equipment, (d) medical devices, including orthopedic and prosthetic appliances, or (e) the like.

The fitting material may be retained, for example, in or by enclosures which provide fitting pads suitable for use in or with a variety of ankle-covering boots or sports footwear, such as ski boots or ice skates, and which, in turn, provide proper and ready controllable fitting, and firm pressure-compensating support and comfort to desired portions or regions of the foot of the wearer [e.g., selected side regions or portions (including the ankle extremities) of the foot].

The fitting pads are adjustable in that they have stable, substantially uniform, vicous but flowable, pressure-compensating fitting material sealably retained therein. When the fitting pads are used, for example, in conjunction with boots, the pads (a) provide improved, lightweight, custom-fitting of the boots to the feet of the individual wearer at ambient or room temperatures, (b) may be removable from and/or re-inserted into the boots, (c) do not require, for fitting purposes, that the wearer physically remove fitting material from the confines of the already formed pads or introduce such material into the pads from an external source, and (d) provide outstanding pressure-compensating support and comfort when the resultant fitted boots are worn during conditions of intended use.

The term "flowable," when referring to the flowable fitting material or composition thereof, characterizes the moldable, shapeable, deformable, or pressure-compensating properties of that fitting material or composition under conditions or applications of fitting and/or use.

The term "fitting," when referring to the flowable fitting material or composition hereof, characterizes the flowable properties thereof, and when referring to boots or ski boots, also characterizes the flowable properties when such boots are fitted to the foot of the intended wearer.

Ski boots presently available generally comprise a relatively rigid outer shell which typically is molded of plastic. Disposed within the outer shell of such boots is an inner member or liner which is relatively soft and flexible, as compared to the shell. The boot also has one or more buckles or other suitable fastening means for selectively opening and closing the boot.

Rear-entry ski boots generally have a pivoting rear tongue member which pivots outwardly away from the shell to provide a rear, vertically extending opening, which accommodates or facilitates placement of the foot of the wearer into the boot. After the foot is placed into the boot from the rear, the rear tongue member is pivoted back into its closed position and is secured in place by fastening means, such as one or more buckles and associated fastening loops or cables. It should be noted that each of U.S. Pat. Nos. 3,798,799 and 3,882,561 to Alden B. Hanson and Chris A. Hanson discloses a rear-entry ski boot. The disclosure of each of those patents is hereby expressly incorporated by reference herein and is a part hereof.

Referring to U.S. Pat. Nos. 3,798,799 and 3,882,561 in added detail, those patents disclose rear-entry ski boots having a substantially rigid, plastic outer shell, and a substantially flexible, inner liner (e.g., polyurethane foam) disposed therein. The outer surface of the liner is generally complementary to the inside surface of the outer shell. The inner surface of the liner is adapted to surround the wearer's foot, including the ankle extremities, is contoured substantially to the outer surface of the wearer's foot, and is adapted to be deformed to custom-fit the foot during the special fitting procedure disclosed therein. The liner is shaped and positioned to provide a clearance or space of one or more cavities (herein "cavity") between its outer surface and the inner surface of the outer shell, which cavity is adapted to be substantially or significantly filled with substantially non-compressible, fitting material. The fitting material is inserted into the cavity, preferably during the course of a special custom-fitting and sizing operation, to complete the assembly. Alternatively, the fitting material may be placed in the cavity prior to the fitting operation, and simply rendered flowable during the custom-fitting operation. Although the fitting material is flowable during the special conditions of the fitting operation, thereafter it solidifies or hardens to give firm support and comfort for skiing purposes.

The fitting material, as disclosed in those particular patents, does not provide a padding function, since it is substantially non-compressible during conditions of use. It does provide, however, a support function for the skier's foot and ankle, and firm contact between the foot and the outer shell of the ski boot.

The custom-fitting operation disclosed in U.S. Pat. Nos. 3,798,799 and 3,882,561 is preferably accomplished by injecting heat-flowable, thermoplastic fitting material into the cavity formed between the outer shell and the liner or into a bladder or enclosure that is positioned in the cavity, with the foot being in place within the liner. The fitting material is heated until it becomes flowable, whereupon it is introduced into the cavity, bladder or enclosure. The wearer waits for the warm fitting material to cool sufficiently and consequently to solidify or harden to provide a custom-fit to the shape of the foot.

The present invention involves the use of my improved, flowable, pressure-compensating fitting material which significantly differs from the disclosure of those patents, particularly the specific fitting operations and fitting means disclosed therein, in that, among other things, a preformed, shaped fitting pad is conveniently used of selected shape and construction, which comprises a flexible, protective enclosure or envelope having confined and retained therein a predetermined or selected amount or volume of flowable, pressure-compensating fitting material with desired fitting and flow characteristics. The flowable fitting material is capable of deforming to the shape of the foot at ambient or room temperatures. The fitting pad (the term "pad", when referring to a fitting pad, may include a plurality of fitting pads). It retains the flowable, pressure-compensating fitting material and is shaped, constructed, and adapted to be positioned in an ankle-covering boot between the boot and the foot. For example, it is adapted to be positioned between an outer shell and a flexible liner member (the term "liner" includes the use of padding means), so as to substantially or significantly fill the space or cavity provided between portions of the shell and liner member that are directly adjacent to or in direct contact with the fitting pad (in overlying and underlying relationship thereto). The fitting pad is adapted to provide and maintain a snug or firm fitting relationship with desired regions of the foot of the wearer during conditions of use while, at the same time, maintaining a high degree of comfort, as explained in added detail later below.

If desired, the fitting pad may be used in conjunction with conventional front-entry or side-entry boots (e.g., ski boots) and the boots may be for a variety of uses (e.g., ice skates).

In the accompanying diagrammatic drawings:

FIG. 1 is a plan view showing an illustrative embodiment of my fitting pad with portions of the enclosure broken away to show its contents;

FIG. 2 is a fragmentary cross-sectional view taken along the line 2—2 of FIG. 1;

Figure 4:
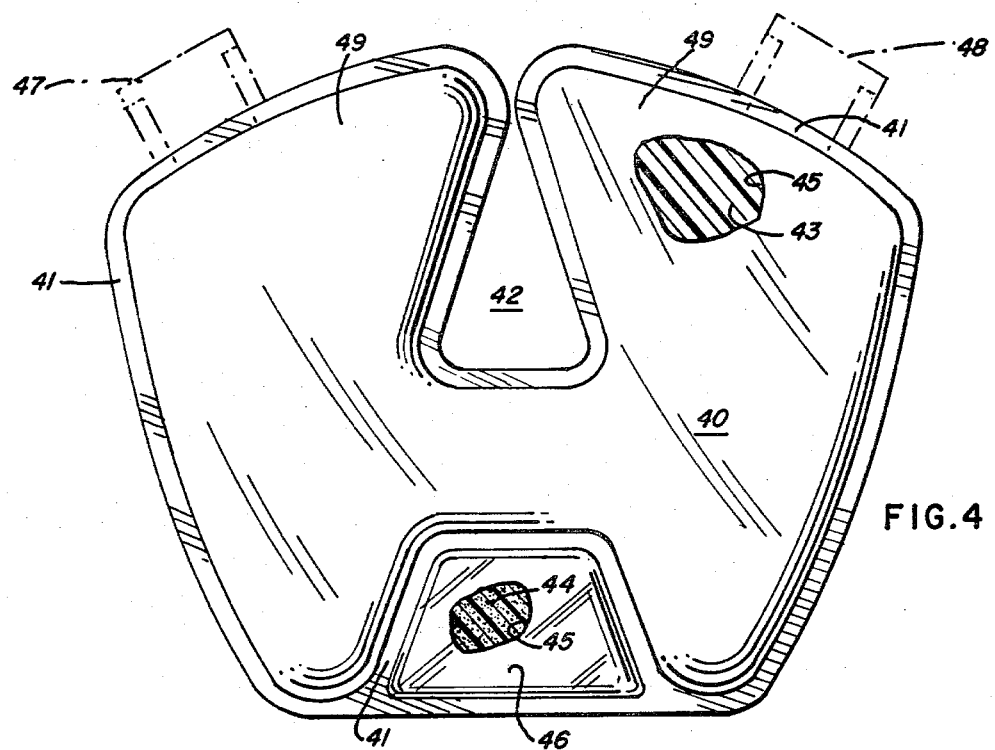
Figure 5:
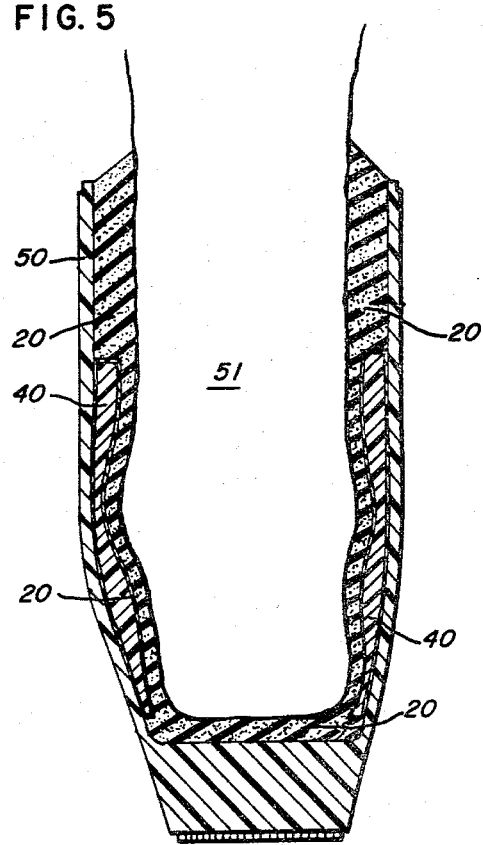

FIG. 3 is a front perspective view showing the fitting pad shown in FIG. 1 positioned in place about selected front and side portions of an illustrative flexible liner member. The assembly shown in FIG. 3 may be positioned, for example, in the semi-rigid, rear-entry, ski boot shell shown in U.S. Pat. Nos. 3,798,799 and 3,882,561;

FIG. 4 is a plan view, similar to FIG. 1, showing a preferred illustrative embodiment of my fitting pad with portions of the enclosure broken away to show its contents; and, FIG. 5 is a front sectional view showing the ankle of a wearer positioned within an illustrative ski boot, and showing the outer shell of the boot, the preferred fitting pad shown in FIG. 4 positioned within a cavity, and the flexible liner member shown in FIG. 3.

The shaped, pressure-compensating fitting pad 10 shown in FIG. 1 is removable from the boot and comprises a shaped, flexible, protective barrier or envelope enclosure with a predetermined or selected amount or volume of flowable, pressure-compensating fitting material 13 retained therein. The envelope enclosure is formed of suitable flexible material and desirably is a pliable, thermoplastic resinous film 15 that is heat-sealed. As shown in FIG. 1, the fitting pad 10 is bifurcated and has two upper legs 16 with opposed inner edges which form a tear drop-shaped opening 12. The opening 12 is shaped so as to facilitate the positioning of the upper legs 16 of the fitting pad 10 about the ankle portion of the flexible liner or padding member 20 in the manner illustrated in FIG. 3. If desired, the portion of the fitting pad 10 that joins the lower extremities of the legs 16 and defines the lower portion of the opening 12, may be vertically split (with the adjacent edges sealed) a distance of about 1 inch; however, that modification is not shown in the drawings.

The unitary, preformed fitting pad 10 is shaped and constructed so as to be positioned over selected front and side portions of the foot and the flexible liner or padding member 20, as shown in FIG. 3. More particularly, FIG. 3 shows the fitting pad 10 placed upon an inner flexible liner or padding member 20. The inner surface of the liner or padding member 20 is contoured substantially to the outer surface of a wearer's foot. The liner or padding member 20 and overlying fitting pad 10 are positioned in place in a substantially rigid, outer ski boot shell (see the outer shell 50 shown in FIG. 5) of appropriate size, so that the fitting pad 10 significantly or substantially fills the space or cavity (the term "cavity" means at least one cavity or a plurality of cavities) between the shell and flexible liner or padding member 20. When the foot of the wearer simply is placed in the boot, the pressure-compensating fitting material 13, although very viscous, flows at ambient temperatures to conform to the contour or shape of the foot and continues to essentially fill the space or cavity, thereby providing and thereafter maintaining a snug or firm, but comfortable, fit without requiring the use of other special fitting operations. As explained later below, that fit is properly maintained during conditions of use.

The particular fitting pad 10 illustrated herein also includes a separate flexible or resilient, lower tab or spacer cushion 14 (see FIGS. 1 and 2), which is retained in place within a separate enclosed portion of the fitting pad, but in separately sealed relationship with respect to the fitting material 13. The lower tab or resilient cushion 14 provides desired pressure relief during skiing at a region of the foot where the use of fitting material 13 is not desired for reasons of comfort. The lower tab 14 may be formed, for example, of foamed, cross-linked polyethylene, such as a L-200 Series Minicell product, supplied by Hercules Incorporated, having, for example, a thickness of about ¼ inch and a density of about 2 lbs./ft.$^3$ The fitting material 10 and tab 14 are shown in FIGS. 1 to 3 sealed (e.g., heat-sealed) in place and separated along the sealing lines 11.

FIG. 3 also shows a separate flexible or resilient, upper spacer tab or cushion 30 which simply may be separately positioned in place against the outer surface of the liner or padding member 20 in the region provided by the U-shaped opening 12 of the fitting pad 10. That upper tab or resilient cushion 30 serves essentially the same purpose and is used for essentially the same reasons as the lower tab or cushion 14. The tab 30 may be formed, for example, of foamed polyurethane, may have a uniform thickness of about ⅛ inch to about ¼ inch, or may be tapered along its essentially vertically extending length to provide a tapered thickness varying from about ¼ inch, at its thickest portion, to about ⅛ inch, at its thinnest portion.

Although not shown in the drawings, the upper spacer tab or cushion 30 may be an integral part or projection of the flexible liner member 20.

The fitting material 13 is initially distributed substantially uniformly throughout the confines of its envelope closure, and may be provided by sealing (e.g., heat-sealing) the thermoplastic film 15 along the marginal edges or sealing lines 11. A second, separate envelope closure portion is shown maintaining the tab 14 in place adjacent the envelope closure for the fitting material. That second envelope closure is formed by sealing (e.g., heat-sealing) separate sheets of the film 15 along the sealing lines 11.

In one illustrative mode of constructing the fitting pad 10, suitably molded or shaped, essentially flat, fitting material having a substantially uniform nominal thickness in the vicinity of about 0.01 inch to about 0.6 inch and lower flexible tab 14 are placed in spaced-apart relationship between two conforming flexible (e.g., flexible at ambient room temperatures and temperatures of use) or pliable sheets of film 15 of thermoplastic resin, which, when entirely or finally sealed, provide a protective barrier or envelope enclosure [e.g., a thermoplastic polyurethane film having a thickness of about 0.006 to 0.015 inch (e.g., about 0.010 inch) and Durometer hardness (Shore A Scale) of about 85, such as MP-1880 film supplied by Stevens Elastomeric & Plastic Products, Inc., a subsidiary of J. P. Stevens & Co., Inc., Easthamptom, Mass., which is a film having a typical tensile strength at 300% stretch of 2,580 psi., typical tensile strength at break (ultimate) of 7,251 psi., typical elongation at break of 440%, typical elongation set of 14.2%, and typical tear strength (Die C) of 351 psi.; or a polyester-based thermoplastic polyurethane film known as "Tuftane" TF-310, sold by B. F. Goodrich General Products Company, Akron, Ohio]. (The polyurethane MP-1880 film mentioned above is elastomeric in that it has memory and tends to at least in part slowly recover upon release of stress that temporarily stretches it). The two sheets of film 15 are connected by being securely heat-sealed together, so as (a) to seal and retain in place the fitting material 13 within the envelope closure formed between the sheets, and (b) to seal and retain in its proper place the foamed polyethylene tab 14. The pressure-compensating fitting pad 10 is then ready for us, for example, in a rear-entry ski boot.

If desired, one may choose to first heat-seal the protective closure for the fitting material, but leave a small vent opening and a small fitting port (not shown), so that a predetermined amount or volume of hot flowable fitting material may be injected into the envelope closure through the filling port, followed by heat-sealing both the vent opening and filling port.

FIG. 4 shows a preferred form of fitting pad 40 comprising a flexible, protective enclosure which maintains a predetermined or selected amount or volume of substantially uniformly distributed, flowable fitting material 43 therein. Pad 40 is adapted to be used in ski boots in essentially the same manner as the fitting pad 10 shown in FIGS. 1 to 3.

Referring to FIG. 4 in added detail, the shaped, pressure-compensating fitting pad 40 comprises a flexible, protective, envelope or enclosure with a predetermined or selected amount or volume of flowable, pressure-compensating fitting material 43 retained therein. The envelope is formed of suitable flexible material and desirably is a pliable, thermoplastic resinous film 45 that is heat-sealed. The film 45 may be formed of the same resinous materials and products described above with respect to the film 15 of the fitting pad 10. The fitting pad 40 has two, upper legs 49 with opposed inner edges which form a tear drop-shaped opening 42. Opening 42 is shaped so as to facilitate the positioning of upper legs 49 of the fitting pad 40 about the ankle portion of the flexible liner or padding member 20 in a manner similar to the opening 12 of the fitting pad 10 (illustrated in FIG. 3).

The particular fitting pad 40 illustrated herein also includes a separate, flexible or resilient, lower tab or spacer cushion 44, which is retained in place within a separate enclosed portion of the fitting pad, but in separately sealed relationship with respect to the flowable fitting material 43. The lower tab or resilient cushion 44 provides desired pressure relief during skiing at a region of the foot where the use of fitting material 43 is not desired for reasons of comfort. The lower tab 44 may be formed, for example, of polyvinyl chloride foam having a uniform thickness of ¼ inch and density of about 8 to 9 lbs./ft.$^3$, such as polyvinyl chloride memory foam sold by Blanchard Industries, Inc., West Orange, N.J.

As shown in FIG. 4, the upper face or layer of the film 45 has a hole 46 (e.g., about 3/16 in. in diameter) therethrough in that portion of the closure which separately retains the lower resilient tab 44. A second similar hole (not shown) is similarly positioned in the opposed underlying face or layer of the film 45. Those holes provide means for air to escape from the resilient tab 44 and the envelope closure which retains it.

In forming the fitting pad 40, the tab or spacer cushion 44 is sealed in place, and the envelope closure is sealed along the sealing lines 41, except for the open filling and venting ports 47 and 48 shown in broken lines in FIG. 4. A predetermined amount or volume of hot, flowable fitting material 43 is inserted into the confines of the envelope enclosure through the filling and venting ports 47 and 48. Thereafter, each of the ports is sealed (e.g., heat-sealed) along the sealing lines 41, so as to entirely close the fitting pad 40, and, if desired, is cut from the fitting pad 40 and discarded.

FIG. 5 is a sectional view showing a foot 51 fitted within a ski boot in which the preferred fitting pad 40 is positioned in the cavity provided between the outer shell 50 of the boot and flexible liner or padding member 20. The fitting pad 40 is positioned in the boot in a manner such that it covers the sides of the ankle, whereby the fitting pad 40 appropriately confines the ankle extremities of the foot.

The pressure-compensating fitting materials 13 and 43, referred to above, are preformed and retained in readily removable and replaceable, sealed, flexible, pliable envelope enclosures or bladders that sealably cover or enclose them, to provide flowable fitting material in the form of separate, removable, replaceable, pressure-compensating fitting pads 10 and 40.

Placement of the above-described fitting pad within the boot is readily accomplished by positioning it about the sides (including the sides of the ankle) and, if desired, at a selected front portion of the foot and/or at the back of the ankle. The fitting pad should be located or positioned about the foot at regions of the foot best able to withstand, as well as needing, its important and distinctive fitting and pressure-compensating characteristics. Upon closing or tightening of the boot, the fitting material will flow or deform during desired conditions of use to conform to the shape of the foot and flexible liner member covered by the fitting pad, and to provide and maintain firm support, a good fit and a high degree of comfort in the vicinity of the foot covered by the fitting pad.

Fitting pads may be positioned, for example, in a variety of footwear or boots that cover the ankle or even footwear that does not cover the ankle, and is not limited to use in rear-entry boots or even ski boots or footwear.

When used in boots, the pressure-compensating fitting pad is preformed in the sense that it is contemplated that it be placed or installed in the boot, or at least be made ready for such placement or installation, at the factory or prior to fitting the boot on the wearer. Therefore, no special custom-fitting operation or conditions are initially required, other than simply to place the foot of the wearer into a boot of appropriate size. During manufacture, a predetermined or selected amount or volume of fitting material may be placed in an appropriate flexible enclosure which is sealed to provide a pressure-compensating fitting pad of a predetermined or selected size, configuration and thickness appropriate for a particular size and style of boot or footwear. By placing the foot into an appropriate boot, the fitting material undergoes sufficient flow within the sealed envelope to allow the fitting pad to conform substantially to the underlying shape or position of the wearer's foot, whereby a snug or firm, but comfortable, fitting is achieved and maintained.

The envelope enclosure may be formed of a variety of flexible and pliable materials that provide a protective barrier for the fitting material sealably contained therein, and which are substantially impervious to the flow or seepage therethrough of necessary or essential constituents or components of the confined fitting material. If the enclosure is formed, for example, of a synthetic resinous film, the film should be flexible or elastomeric both at ambient room temperatures and at temperatures of use, which for ski boots is at least as low as about $-20°$ F.

In selecting the barrier material for the enclosure, it should be kept in mind that its thickness, surface hardness, flexible and resilient characteristics may affect the "feel" of the fitting pad and the response of the pad and retained fitting material to various conditions of use. Consequently, great care should be used in its selection.

When the sealed envelope enclosure is formed, for example, of somewhat resilient or elastomeric material 15 and 45, the fitting material 13 and 43 confined therein tends to slowly and at least in part recover (during conditions of use) upon release or relief of deforming pressure. Moreover, the flow and recovery of the finished fitting material is responsive to forces applied and/or relieved during fitting and/or conditions of use.

Although I prefer to use my flowable, pressure-compensating fitting material or composition within a flexible enclosure or envelope to provide a separate fitting pad, if desired, one could, for some purposes, also place the fitting material, without an enclosure or envelope, into a suitable confining cavity formed, for example, between the foot and a boot, or between the shell and flexible liner member of a boot (e.g., ski boot) and/or between the shell and the foot.

The fitting material, when used, for example, in boots (e.g., ski boots), is viscous, but flows and deforms under controlled pressure conditions during fitting the boot to the wearer and conditions of intended use, so as to snugly or firmly, but comfortably, fit or conform to the shape of the foot when the foot is placed or fitted in the boot, and, subsequently, during usage, such as skiing or other activities. At the same time, the fitting material provides effective means for substantially filling the cavity.

More specifically, the pressure-compensating fitting material is flowable or formable. It conforms or deforms to an irregular shape. It substantially retains that shape when relieved of deforming pressure. It does not "sag" or slump significantly or noticeably upon storage at ambient temperatures. When used with or in boots, the fitting material provides positive foot control for the wearer during conditions of use.

The shape of the fitting material may be changed, for example, by the application of continuously applied pressure or shear stress that exceeds some desired minimum level. After the "yield point" (discussed later below) of the fitting material is reached, it flows under shear stress. In this respect, the fitting material responds in a manner generally expected of a liquid. When the fitting material is confined, for example, within an envelope enclosure and when the resultant pad is confined, for example, in a boot, during conditions of use the fitting material flows in response to continuously applied pressure and the relief of such exerted, flow-producing pressure, and is resistant to flow in response to instantaneously applied pressure.

Furthermore, appropriately positioned fitting material does not tend to flow away from those portions of the foot which require support or tend to flow out of desired locations to provide an uncomfortable fit.

Referring to the confined, flowable fitting material, as well as its use in boots, in added detail, the fitting material is a thermoplastic composition and should have a substantially homogeneous consistency. It provides deformable, controllable, pressure-compensating support. It is lightweight and has a low specific gravity (e.g., a density of less than about 1 gm./cc., or in the vicinity of about 0.2 to 0.8 gm./cc., or, preferably, in the vicinity of about 0.3 to 0.6 gm./cc.). It is flowable during fitting and conditions of use about the adjacent or underlying portion of the foot, so as to be capable of essentially assuming or conforming to or snugly or firmly fitting its shape to that of the foot in an effective, but comfortable, manner. It gives desired firm support and comfort, for example, for skiing or other intended purposes. It is a viscous material, as pointed out above, and may be considered as being highly viscous, and should not significantly or substantially change in volume responsive to ambient temperatures or ambient temperature changes. When heated, the fitting material is sufficiently flowable to be conveniently handled (e.g., pumped) for further processing operations. It may advantageously have a nominal thickness, for example, within the vicinity or range of about 0.01 inch to about 0.6 inch, depending on the purpose and conditions of use (e.g., the space which defines the thickness of the space or cavity between the shell and the flexible liner member of the boot and the foot).

As stated above, when the fitting material is confined, during conditions of use it is resistant to flow in response to instantaneously applied pressure; however, it flows in response to continuously applied pressure to provide some pressure on portions of the foot that can best withstand it and to allow portions of the foot to at least momentarily move away from pressure.

The confined fitting material undergoes flow and deformation away from the areas of highest pressure. For example, this occurs when the fitting material is positioned, in the form of a pad, in the boot and the boot is being fitted, and for a brief period immediately thereafter. That is, the fitting operation produces a mass displacement of some of the fitting material to accomodate the shape of the foot and to tend to equalize the pressure throughout the fitting pad.

Another type of deformation occurs as a result of the added forces which are incurred, for example, during skiing, whereby the foot is forced against the boot to turn the ski, or the ankle is flexed forwards or backwards to compress part of the flexible liner member of the boot. This type of deformation (e.g., the liner member and fitting pad), which may be characterized as being ideally or essentially compressive in nature, is essentially or at least in part recoverable upon relief of the deforming forces or pressure.

Apart from the microbeads distributed in the fitting material, the fitting material is substantially homogeneous at room temperature and remains substantially homogeneous (i.e., substantially stable) in that, for example, it does not separate undesirably into different phases under normal storage conditions or temperatures, or at temperatures or under conditions of intended use. The components or ingredients of the fitting material must not chemically interact or react with or attack each other in a destructive manner. Furthermore, the fitting material should significantly resist substantial change of the desired flow characteristics under conditions and temperatures of fitting and use. It is appreciated, however, that many fitting materials tend to stiffen or harden at low temperatures, but, for low temperature use, such variations should be kept to an acceptable minimum.

Accordingly, when the fitting material is used in conjunction with ski boots or the like, the fitting material should have sufficient stability and desired pressure-compensating flow characteristics at low temperatures.

The fitting material essentially consists of a compatible combination of (1) wax and oil, and (2) discrete, lightweight, sturdy particles comprising glass ("glass," as used herein to described microbeads, includes appropriate glassy, siliceous or ceramic microbeads) microbeads of micron dimensions (e.g., hollow or unicellular, glass microbeads), including, if desired, the use of glass microbeads in combination with different kinds and types of discrete microbeads which impart different desired characteristics, such as imparting or controlling resiliency.

Although I generally prefer to use a major proportion by weight of the combination of wax and oil, and a minor proportion by weight of glass microbeads, for at least some purposes one may use up to about 60% by weight of glass microbeads.

For some purposes, advantageous results may be achieved by also including a thickening agent in the fitting material, such as oil-soluble soaps (e.g. sodium palmitate, zinc stearate or aluminum stearate).

The blend or mixture of wax and oil is coherent and not crumbly, and is viscous, flowable, substantially homogeneous, and preferably constitutes the predominant and continuous phase. The glass microbeads of a micro-size are substantially uniformly distributed or dispersed therethrough (wax-oil), and should constitute an essentially discontinuous solid phase.

Referring to the lightweight, sturdy microbeads, as pointed out above, a combination of a variety of different kinds and types of discrete microbeads may be used in combination or conjunction with the glass microbeads to impart different selected characteristics, including the use of microbeads which are resilient, hollow and unicellular, and are formed of polymeric or synthetic resinous materials, particularly thermoplastic materials which may be heat-expanded from a granular or bead form to assume a monocellular, solidified foam-like structure by the action of various agents for expanding or blowing the materials, as disclosed, for example, in U.S. Pat. No. 3,615,972 to Morehouse et al. and in my U.S. application Ser. No. 663,213, filed Mar. 2, 1976 and now abandoned.

For example, an appropriate mixture of glass microbeads and "Saran" Microspheres XD-8217 (heat-expanded particles of a resilient vinylidene chloride-acrylonitrile copolymer) may be effectively distributed substantially uniformly throughout a mixture of wax and oil, which, in turn, preferably should be a continuous phase in the fitting material.

My U.S. application Ser. No. 723,912, filed Sept. 16, 1976, discloses that for certain selected purposes and conditions, various lightweight, sturdy microbeads, such as glass microbeads, may be used to impart selected characteristics and may not be resilient (as such), polymeric or resinous, and/or of an expanded form.

Excluding the glass microbeads present in the fitting material, the remaining materials or components (e.g., wax and oil) preferably should be present in the fitting material in amounts or proportions sufficient (a) to more than merely thinly coat substantially the entire outer surface of essentially each of the microbeads and/or (b) to more than merely form a film over the surface of essentially each of the microbeads. The combined volume of those other blended materials or components, namely mixture with wax and oil, preferably should be more, and, more particularly, may be significantly or substantially more, than the volume of the interstitial spaces of the quantity of free-flowing microbeads alone.

By using beads of a micro-size, the resistance to flow of the fitting material tends to increase, thereby facilitating slower recovery. Furthermore, sturdier lightweight or low density beads are provided as a result of their small or micro-size.

The combination of materials and the proportions thereof present in my flowable, pressure-compensating fitting composition are interrelated and unobviously contribute to many of the important and unexpected characteristics of the fitting composition, including properties concerning the yield point, resiliency and flow characteristics thereof.

The "yield point" of the flowable, pressure-compensating fitting material relates to its viscosity or flow properties and is characterized, as with Bingham plastics, by the material resisting flow until the shear stress being applied thereto exceeds some minimum value, after which the material flows under shear stress in a Newtonian or non-Newtonian manner. Consequently, the yield point reflects the force that must be applied to or exerted on the fitting material before flow is produced, and the term "minimum yield point," as used herein, refers to the minimum force needed for inducing such flow under shear stress. The minimum yield point of my flowable, pressure-compensating fitting materials disclosed herein is at least about 4 gms./cm.$^2$ If the yield point of the fitting composition is too low, the material slumps during periods of non-use. On the other hand, if the yield point is too high, it does not conform to the shape of the foot in a reasonably responsive and controlled manner.

Under conditions of use and when confined within an appropriate envelope enclosure which, in turn, is confined in a boot, the fitting material is virtually resilient in the sense that it is momentarily or slowly, at least partly recoverable, as opposed to being instantaneously recoverable, upon release or relief of pressure loads that cause it to deform; such resistance to rapid recovery generally is preferred. For example, at least partial recovery after deformation may take place, for example, within the time span or vicinity of about 0.25 to about 30 sec., which is considered as being "slowly" recoverable.

The fitting composition must not constantly apply pressure to the foot, as it would if it were too resilient. On the other hand, it should not flow too quickly or too responsively, otherwise it would not resist flow in response to instantaneously applied pressure or quick movements of the foot while flowing in response and conformance to continuously applied pressure.

The flow characteristics of the fitting composition meet the desired needs of the user, and, for example, when used in ski boots, are reasonably or appropriately responsive for the transmittal of the desired action and control to the skis.

Referring next to specific illustrative compatible (a) wax, (b) oil and (c) lightweight, sturdy, glass microbeads, in that order, the wax component, for example, may be a suitable natural, mineral, petroleum-based synthetic, vegetable, or animal wax (includes insect wax), such as beeswax [e.g., SC 10979 beeswax (yellow), supplied by Sargent-Welch Scientific Co., Skokie, Illinois], paraffin wax, or microcrystalline wax.

The wax component, as such, although deformable under pressure, is substantially incompressible, as such, and is an essentially non-flowable solid at temperatures below about 110° F., but softens and flows at higher temperatures.

Particularly good results are obtained with microcrystalline wax. Microcrystalline wax is a mixture of solid hydrocarbons derived from petroleum. More particularly, it is a mixture of alkylated naphthenes (saturated cycloparaffins) and isoparaffins (branched chains) with varying amounts of normal paraffins (straight chains). Microcrystalline waxes generally have an average molecular weight of about 580 to 700, although in some instances the molecular weight of paraffin wax generally is much lower, usually ranging from about 260 to 420 and having individual molecules varying from about 20 to 30 carbon atoms. As the same implies, microcrystalline wax refers to the crystalline size when in the solid state, and has crystals that are much smaller than those of paraffin wax (sometimes referred to as macrocrystalline wax). Microcrystalline wax generally has good low temperature flexibility, adhesion and excellent resistance to moisture penetration under conditions of stress and strain, and, therefore, generally is preferred over paraffin wax, particularly when the fitting material is used in boots for use at low temperatures (e.g., ski boots).

In preparing the fitting material for use with ski boots, outstanding results are achieved using HM 1319 wax, a microcrystalline wax-based, hot melt adhesive product formulated and supplied by HB Fuller Company, St. Paul, Minnesota. That wax product is light yellow, has a typical "application" temperature of 180° F. to 200° F., and has a typical ring and ball softening point of 174° F. to 176° F. It essentially consists of 85% by weight of microcrystalline wax, and 15% by weight of "Tufflo" 6204 oil. "Tufflo" 6204 oil, supplied by Atlantic Richfield Company, is a technical grade naphthenic-type white mineral oil having the following typical properties:

| Viscosity | |
|---|---|
| 100° F., S.U.S. | 1750 |
| 210° F., S.U.S. | 91 |
| Gravity, A.P.I. | 23.4 |
| Specific Gravity 60/60 | 0.9135 |
| Density, lbs./gal. | 7.61 |
| Color, Saybolt | +20 |
| Flash Point, °F. | 465 |
| Pour Point, °F. | +15 |
| Aniline Point, °F. | 232 |
| Refractive Index, 20° C. | 1.4945 |
| Viscosity Gravity Constant | 0.840 |
| Molecular Weight | 490 |
| % Volatility, 22 hrs./225° F. | 0.3 |
| U.V. Absorptivity, 260 mµ | 0.2 |
| Acid No. | 0.0 |
| Aromatics, % | 14 |
| Saturates, % | 86 |
| Distillation, °F.: | |
| I.B.P. | 620 |
| 5% | 745 |
| 50% | 880 |
| 95% | 1020 |

Furthermore, good results have been achieved preparing fitting material for use in ski boots using a wax product formulated and supplied by Leisure Research, Inc., U.S. Ski Wax Division, essentially consisting of 85% by weight of microcrystalline wax, 10% by weight of "Carnea" 21 oil, and 5% by weight of glycanol, a plasticizer. "Carnea" 21 oil, supplied by the Shell Oil Company, is a grade of mineral oil with a low viscosity index and low natural pour point, and, more particularly, has a typical viscosity, S.S.U., of 105 at 100° F. and 38 at 210° F., a typical flash point of 325° F., and a typical pour point of −30° F.

The added or separate oil component of the fitting material may be a suitable natural, synthetic, vegetable, or petroleum-based oil (neutral blending or bright stock). In order to facilitate control of the flow characteristics of the finished fitting material, it is important not to useunsaturated natural or vegetable drying or semi-drying oils that are unsaturated in such a manner or to such a level as to oxidize, thicken or harden significantly (e.g., polymerize or cross-link) with time or conditions of storage or use, which in many instances is reflected by the oil having an excessively high or unsatisfactory iodine number.

The oil component, for example, may comprise petroleum-based oil, such as exemplified by "Carnea" 21 oil, "Tufflo" 6204 oil, "Topco" Motor Oil, S.A.E. 20 (supplied by the King Super Market, Boulder, Colorado), R Industrial #5-H oil [a neutral base oil supplied by American Oil Co. having a typical viscosity of 300–320 sec. (S.U.V.) at 100° F., typical flash point of 450° F., typical pour point (max.) of 0, and typical viscosity index (min.) of 95], or suitable admixtures thereof. Moreover, if desired, vegetable oil, such as coconut oil (e.g., SC 11518 coconut oil supplied by Sargent-Welch Scientific Co., Skokie, Illinois), may be used, at least for some purposes.

The combined density of the wax and oil component present in the fitting composition should be, for example, in the vicinity of about 0.5 to 1.0 gm./cc., or, more particularly, in the vicinity of about 0.75 to 0.90 gm./cc.

Although I prefer that the sturdy, lightweight, low density, discrete, glass microbeads be generally spherical (i.e., microspheres) and hollow or unicellular to lessen their density and lighten the overall weight of the flowable, pressure-compensating fitting material, if desired, they may be of other suitable micro-shapes or microforms, or, if desired, even formed of solid glass or cellular forms of glass. The micro-size of the hollow glass microbeads may be within the size range, for example, of about 10 to 300 microns.

The density of the glass microbeads should be, for example, about 0.05 to 0.70 gm./cc., or, more particularly, about 0.15 to 0.30 gm./cc. It is essential, however, that the density of the glass microbeads be lower than the combined density of the other components, namely, the wax-oil phase, and therefore the glass microbeads are considered to be a density-reducing component of the fitting material.

More particularly, "Eccospheres" IG 25 glass particles in the form of hollow, unicellular microbeads of Emerson & Cuming, Inc. (Canton, Mass.), may be used advantageously. That dry product is particulate and free-flowing, and consists of discrete, lightweight or low density (typically has a true particle density of about 0.25 gm./cc.), sturdy, thin-walled shells in the form of spheres of micron dimensions, and is herein included within the terms "microbeads" and "microspheres". That particular product has a lower density than the wax-oil mix, thereby lowering the overall weight of a predetermined or selected volume of fitting material, as well as the resultant fitting pad, has good thermal insulation characteristics, is of a relatively low cost, and is inert and colorless.

Typical physical properties of "Eccospheres" IG 25, an "industrial" grade product, are as follows:

| Composition | Sodium Borosilicate Glass with a Softening Temperature of 900° F., or 482° C. |
|---|---|
| True Particle Density (Liquid Displacement) | 0.237 gm./cc., or 14.8 lbs./ft.$^3$ |
| Bulk Density (Tamped) | 0.145 gm./cc., or 9 lbs./ft.$^3$ |
| Packing Factor (Volume Fraction Occupied by Particles in Tamped Condition in Air) | 0.614 |
| Particle Size Range: | |
| >175 Microns | 0% by Weight |
| 149-175 Microns | 6% by Weight |
| 125-149 Microns | 6% by Weight |
| 100-125 Microns | 13% by Weight |
| 62-100 Microns | 42% by Weight |
| 44-62 Microns | 12% by Weight |
| <44 Microns | 21% by Weight |
| | 100% by Weight |
| Average Particle Diameter (Weight Basis) | 75 microns |
| Average Wall Thickness (Weight Basis) | 1.5 microns |
| Thermal Conductivity | 0.7 B.T.U./in./hr./ft.$^2$/°F., or 8.68 K cal./cm./hr./m.$^2$/°C. |
| Strength Under Hydrostatic Pressure (Volume % Survivors at 1500 psi.) | 44 |

Referring to properties maintained above, the "softening temperature" is the temperature at which surfaces of the microbeads become tacky enough to stick together. The "true particle density" is the weight of a sample divided by the volume of liquid displaced by the sample, and is the weight of the average particle divided by its volume. The "bulk density" is the weight of a tamped sample in air divided by its bulk volume. The "packing factor" is the volume of liquid displaced by a sample divided by the volume of the tamped sample in air, and is the ratio of the "true particle density" to the "bulk density." The "thermal conductivity" is measured on a tamped sample in air.

If desired, other "Eccospheres" products or grades thereof of Emerson & Cuming, Inc. may be used, such as "Eccospheres" FTL 200. Moreover, low density, sturdy, silica glass and insoluble glass microbeads and ceramic microbeads may also be used.

"Eccospheres" IG 25 glass microbeads are not flammable, are readily wetted, inert and pinhole-free, and have a low true density. When compared with plastic expandable microbeads such as "Saran" Microspheres XD-8217 of The Dow Chemical Company (i.e., a heat-expandable, resilient' copolymer of vinylidene chloride and acrylonitrile with a neuclues of a thermally-responsive, encapsulated, liquefied blowing or expanding agent, such as isobutane), those particular glass microbeads are less expensive and are stronger than expanded forms of those particular plastic microbeads, and do not require expansion (thermal or otherwise). Since the glass microbeads do not expand during or as part of the preparation of the fitting material, they do not undergo physical change during production of the finished fitting material, which conveniently provides for the accurate control of a predetermined or selected volume of fitting material which later is inserted on a production basis into envelope enclosures.

The stiffness or hardness of my flowable, pressure-compensating fitting material may be determined, for example, as static penetration at selected temperatures by dropping a small cone in accordance with ASTM D 217. The small cone is allowed to drop for 5 sec. onto and penetrate into the finnished fitting material, which is not in an envelope enclosure. The depth that the cone penetrates in that time limit, in millimeters, is the penetrometer reading. Penetrometer readings decrease if the fitting material stiffens with a lowering of the temperature. For example, with a 50-gm. penetrometer load, the penetrometer reading might be in the vicinity of or between about 6 to 12 mm. at a temperature of −20° F. and might be in the vicinity of or between about 10 to 24 mm. at a temperature of 75° F.

Since the foregoing penetrometer readings are taken on the fitting material per se, those readings may vary widely and still provide satisfactory fitting pads, depending upon the particular envelope enclosure used to retain the fitting material. For example, the thickness, flexibility, surface hardness, and resiliency of the film used to form the envelope enclosure affect the "feel" of the filled fitting pad and the requisite stiffness and hardness of the retained fitting composition per se.

Briefly, Tables 1-A and 1-B below, relate to a particularly preferred illustrative fitting composition; Tables 2-A and 2-B, below, illustrate the broad range of amounts of materials or components which may be used in my finished fitting compositions; and Tables 3-A and 3-B, below, illustrate a preferred range of amounts (on a weight basis) of materials or components which may be used in my finished fitting compositions.

Referring first to Table 1-A, below, that Table illustrates a preferred illustrative fitting material, and preparation thereof is illustrated in Example 1, later below. More particularly, the fitting material depicted in Table 1-A is based on using a particular wax product (i.e., HM 1319 wax of the HB Fuller Company) having 85% by weight of microcrystalline wax physically combined with 15% by weight of a petroleum-based oil (i.e., "Tufflo" 6204 oil), although the wax product used need not have been previously physically combined with any of the oil ultimately present in the finished formulation.

Furthermore, the values set forth in Table 1-A were determined based on using (a) a wax-oil having 25% by weight of HM 1319 wax and 75% by weight of separately added "Tufflo" 6204 oil, so that 25% by weight of that particular wax product (with 15% by weight of oil) is present in or added to the wax-oil mix with 75% by weight of separately added "Tufflo" 6204 oil, and (b) 30% by weight of sturdy, low density, hollow, unicellular, glass microbeads (i.e., "Eccospheres" 1G 25 particulate glass spheres), based on the total weight of the particular wax product (combined with 15% by weight of oil), the separately added oil, and the glass microbeads (i.e., "Eccospheres" 1G 25 glass spheres). Stated differently, 52.5% by weight of "Tufflo" 6204 oil, 17.5% by weight of HM 1319 wax, and 30% by weight 1G 25 "Eccospheres" glass microspheres are uniformly admixed, and the glass microspheres are distributed substantially uniformly throughout the wax-oil mix.

The typical specific gravity of the finished fitting material of Table 1-A is about 0.45.

Table 1-A follows next.

TABLE 1-A

| | Parts or Percent by Weight |
|---|---|
| Hollow, Glass Microbeads | 30% |
| Wax (Excludes any Combined Oil) | 14.9% |
| Oil (Includes any Combined Oil with the Wax) | 55.1% |
| | 100% |

Based on the foregoing formulation depicted in Table 1-A the composition of that formulation is further summarized in Table 1-B, below.

TABLE 1-B

| | |
|---|---|
| 78.7% by | weight oil, based on weight of wax and oil. |
| 55.1% by | weight oil, based on weight of wax, oil and glass microbeads. |
| 21.3% by | weight wax, based on weight of wax and oil. |
| 14.9% by | weight wax, based on weight of wax, oil and glass microbeads. |
| 30% by | weight glass microbeads, based on weight of glass microbeads, wax and oil. |
| 1 part by weight of glass microbeads per 2.33 parts by weight of both wax and oil. | |

The wax and oil phase is continuous, the glass microbeads constitute a discontinuous solid phase, and the wax and oil phase is present in an amount and proportion (weight basis) sufficient (a) to more than merely thinly coat substantially the entire outer surface of essentially each of the glass microbeads or to more than merely form a film over the surface of essentially each of the glass microbeads, and (b) to provide a volume that is more than the volume of the interstitial spaces of the quantity of glass microbeads alone.

Referring next to Table 2-A, below, that Table illustrates a broad range of amounts of materials or components that may be used in formulating fitting materials. More particularly, the formulations depicted in Table 2-A are based on using a particular wax product (i.e., HM 1319 wax of the HB Fuller Company) having 85% by weight of microcrystalline wax physically combined with 15% by weight of a petroleum-based oil (i.e., "Tufflo" 6204 oil), although the wax product used need not have been previously physically combined with any of the oil ultimately present in such finished formulations.

Furthermore, the broad ranges set forth in Table 2-A were determined based on using (a) a wax-oil mix having from 11.8 to 61.5% by weight of HM 1319 wax, and from 38.5 to 88.2% by weight of separately added "Tufflo" 6204 oil [so that from 11.8 to 61.5% by weight of that particular wax product (with 15% by weight of oil) is present in or added to the wax-oil mix with from 38.5 to 88.2% by weight of separately added "Tufflo" 6204 oil], and (b) from 10 to 60% by weight of sturdy, low density, hollow, unicellular, glass microbeads (i.e., "Eccospheres" 1G 25 particulate glass spheres), based on the total weight of the particular wax product (combined with 15% by weight of oil), the separately added oil, and the glass microbeads (i.e., "Eccospheres" 1G 25 glass spheres).

The specific gravity of the finished fitting material, for example, may be in the vicinity of or from about 0.2 to about 0.8. The density of the wax and oil phase, for example, should be in the vicinity of or from about 0.5 to 1.0 gm./cc., and the density of the glass microbeads, for example, should be in the vicinity of or from about 0.05 to 0.70 gm./cc.

Table 2-A follows next.

TABLE 2-A

| | Parts or Percent by Weight |
|---|---|
| Hollow, Glass Microbeads | 10 to 60% |
| Wax (Excludes any Combined Oil) | 8.5 to 34% |
| Oil (Includes any Combined Oil with the Wax) | 26.5 to 81% |

Based on the foregoing formulations depicted in Table 2-A, the composition of those formulations is further summarized in Table 2-B, below.

TABLE 2-B

| | |
|---|---|
| 90.5 to 43.8% by | weight of oil, based on weight of wax and oil. |
| 81 to 26.5% by | weight of oil, based on weight of wax, oil and glass microbeads. |
| 9.5 to 56.2% by | weight of wax, based on weight of wax and oil. |
| 8.5 to 34% by | weight of wax, based on weight of wax, oil and glass microbeads. |
| 10 to 60% by | weight microbeads, based on weight of glass microbeads, wax and oil. |
| 1 part by weight of glass microbeads per 0.7 to 9 parts by weight of both wax and oil. | |

Referring next to Table 3-A, below, that Table illustrates a preferred range of amounts of materials or components that may be used in formulating fitting materials. More particularly, the formulations depicted in Table 3-A are based on using HM 1319 wax of the HB Fuller Company and "Tufflo" 6204 oil.

Furthermore, the preferred ranges set forth in Table 3-A were determined based on using (a) a wax-oil mix having from 16.7 to 35.7% by weight of HM 1319 wax, and from 64.3 to 83.3% by weight of separately added "Tufflo" 6204 oil, and (b) from 23 to 30.7% by weight of sturdy, low density, hollow, unicellular, glass microbeads (i.e., "Eccospheres" IG 25 particulate glass spheres), based on the total weight of that particular wax product (combined with 15% by weight of oil), the separately added oil, and the glass microbeads (i.e., "Eccospheres" IG 25 glass spheres).

In the preferred finished fitting materials, the wax and oil phase provides a volume that is more than the volume of the interstitial spaces of the quantity of glass microbeads alone. It is particularly desirable for the volume of the wax and oil phase to be substantially more than the volume of the interstitial spaces of the quantity of glass microbeads alone, and to be present in an amount or proportion sufficient to more than merely thinly coat substantially the entire outer surface of essentially each of the microbeads or to more than merely form a film over the surface of essentially each of the microbeads.

The specific gravity of the finished fitting material, for example, may be in the vicinity of or form about 0.3 to about 0.6. The density of the wax and oil phase, for example, should be in the vicinity of or from about 0.75 to 0.90 gms./cc., and the density of the glass microbeads, for example, should be in the vicinity of or from about 0.15 to 0.30 gm./cc.

Table 3-A follows next.

TABLE 3-A

|  | Parts or Percent by Weight |
|---|---|
| Hollow, Glass Microbeads | 23 to 30.7% |
| Wax (Excludes any Combined Oil) | 10.2 to 21.25% |
| Oil (Includes any Combined Oil with the Wax) | 46.8 to 63.75% |

Based on the foregoing formulations depicted in Table 3-A, the composition of those formulations is further summarized in Table 3-B, below.

TABLE 3-B

| 86.2 to 68.8% by | weight oil, based on weight of wax and oil. |
|---|---|
| 63.75 to 46.8% by | weight oil, based on weight of wax, oil and glass microbeads. |
| 13.8 to 31.2% by | weight wax, based on weight of wax and oil. |
| 10.2 to 21.25% by | weight wax, based on weight of wax, oil and glass microbeads. |
| 23 to 30.7% by | weight glass microbeads, based on weight of glass microbeads, wax and oil. |
| 1 part by weight of glass microbeads per 2.3 to 3.3 parts by weight of both wax and oil. | |

The illustrative fitting materials and proportions shown in the foregoing tables (i.e., Tables 1-A, 1-B, 2-A, 2-B, 3-A and 3-B) are also generally applicable, perhaps with minor adjustments, when suitable non-petroleum-based waxes (e.g., animal waxes) and suitable non-petroleum-based oils (e.g., vegetable oils) are used.

Example 1, set forth below, is for purposes of illustration only, and the products of the invention and methods for making or using then are not necessarily limited thereto.

EXAMPLE 1

This Example concerns the preparation of the flowable, pressure-compensating fitting material depicted in Table 1-A, above.

17.5 Lbs. of hot HM 1319 wax at a temperature of about 220° F., 52.5 lbs. of hot "Tufflo" 6204 oil at a temperature of about 180° F., and 30 lbs. of "Eccospheres" IG 25 glass microspheres area added to the mixing bowl of a Model F-20 (20 qt.) Electric Mixer of G. S. Blakeslee & Co., Chicago, Illinois. (The bowl may be kept in an oven at a temperature of about 200° F. between batches.) The mixer is operated for about 2 to 3 min. or until the resultant mix is homogeneous and has a uniform and smooth consistency.

The resultant smooth fitting material is poured at a temperature between about 130° to 170° F. (e.g., between 150° to 160° F.) to facilitate flow into a Model 31-A Electric Filler of Mateer-Burt Co., Wayne, Pa., so as to dispense a predetermined or selected volume of hot, finished fitting material into the filling and venting ports 47 and 48 (shown in broken lines in FIG. 4) of the envelope enclosure of the fitting pad 40 shown in FIG. 4, after which those ports are heat-sealed. It is important to dispense the finished, homogeneous, smooth fitting material in a hot state so that the material is sufficiently flowable for dispensing purposes.

A predetermined or selected volume of finished fitting material is inserted into a particular size of envelope enclosure so as to leave as little as possible unfilled space in the enclosure. Moreover, the inserted volume should be the same for ski boots designated for both the left and right foot. In providing filled envelope enclosures for five illustrative sizes of ski boots, the following illustrative volumes (with a variation of ±10 ml.) of finished fitting material may be inserted into individual envelope enclosures of appropriate size and shape (see FIG. 4) to provide a fitting pad 40 having a substantially uniform thickness of finished fitting material throughout the confines of the envelope enclosure:

| Assignee's Own Designation of Size of Boot | Volume of Added Fitting Material in Sealed Envelope Enclosure |
|---|---|
| 1 | 175 ml. |
| 2 | 205 ml. |
| 3 | 285 ml. |
| 4 | 360 ml. |
| 5 | 420 ml. |

It is important that the volume of finished, flowable, pressure-compensating fitting material which is inserted into the respective envelope enclosures of a particular volumetric size be controlled and substantially uniformly distributed therein. Generally, it is desirable to provide and maintain some effective thickness of fitting material about the ankle portion during conditions of use.

The foregoing detailed description has been given for clearness of understanding only, and the forms of the invention shown and described therein are to be considered only as illustrative, and so unnecessary limitations should be understood therefrom, as modifications will be obvious to those skilled in the art without departure from the spirit of the invention or the scope of the appended claims, which follow.

I claim:
1. A viscous, flowable, pressure-compensating composition, which essentially consists of:
a substantially homogeneous, substantially stable, viscous, flowable, continuous phase formed of the combination of wax and oil, and, in combination therewith a discontinuous, microbead phase of particles of discrete, lightweight, sturdy, glass mi- crobeads and lightweight, sturdy, resilient, resin microbeads which impart selected characteristics which are different than those associated with said glass microbeads, said glass and resin microbeads being substantially uniformly distributed in and having a lower density than said continuous phase with the combination of wax and oil;

said wax and oil phase being present in an amount sufficient (a) to more than merely thinly coat substantially the entire outer surface of essentially each of said microbeads or to more than merely form a film over the surface of essentially each of said microbeads, and (b) to provide a volume that is substantially more than the volume of the interstitial space of the quantity of microbeads alone;

said composition being characterized by being a viscous, flowable and thus deformable, and pressure-compensating composition having a specific gravity in the vicinity of about 0.8, or less, having a substantially homogeneous consistency and not substantially changing in volume responsive to ambient temperatures or ambient temperature changes, being resistant to sag, flowing in response and conformance to continuously applied pressure, flowing under shear stress after its yield point is reached, and, when confined during conditions of use, being resistant to flow in response to instantaneously applied pressure, having resilient characteristics in that it is momentarily or slowly, at least in part, recoverable from deformation upon or following the relief of deforming pressure loads, and undergoing flow and deformation away from areas of highest pressure loads.

2. The composition of claim 1, wherein the density of the combination of wax and oil is about 0.5 to 1 gm./cc., the density of the glass microbeads is about 0.05 to 0.70 gm./cc., and the specific gravity of the composition is about 0.2 to 0.8.

3. The composition of claim 1, wherein the density of the combination of wax and oil is about 0.75 to 0.90 gm./cc., the density of the glass microbeads is about 0.15 to 0.30 gm./cc., and the specific gravity of the composition is about 0.3 to 0.6.

4. The composition of claim 1, wherein the proportions by weight of said wax, oil and glass microbeads are such as to provide a major proportion by weight of said continuous phase with wax and oil, and a minor proportion by weight of the discontinuous phase of glass microbeads.

5. The composition of claim 1, wherein said composition has about 10 to 68% by weight of hollow, glass microbeads, about 8.5 to 34% by weight of wax, and about 26.5 to 81% by weight of oil.

6. The composition of claim 1, wherein said composition has about 23 to 30.7% by weight of hollow, glass microbeads, about 10.2 to 21.25% by weight of wax, and about 46.8 to 63.75% by weight of oil.

7. The composition of claim 1, wherein said composition is characterized by having a penetrometer value, 5 sec. after dropping a cone under a 50-gm. load, in the vicinity of between about 6 to 12 mm. at a temperature of $-20°$ F. and in the vicinity of between about 10 to 24 mm. at a temperature of 75° F.

8. The composition of claim 1, wherein said glass and resin microbeads are hollow.

9. The composition of claim 1, wherein said glass and resin microbeads are hollow unicellular microspheres.

10. The composition of claim 1, wherein said wax comprises petroleum-based wax.

11. The composition of claim 10, wherein said petroleum-based wax comprises microcrystalline wax.

12. The composition of claim 1, wherein said oil comprises petroleum-based oil.

13. The composition of claim 1, wherein said wax comprises petroleum-based wax and said oil comprises petroleum-based oil.

14. The composition of claim 1, wherein said composition is shaped to have a nominal thickness in the vicinity of about 0.01 to 0.6 inch.

15. The composition of claim 1, wherein said wax comprises petroleum-based wax, said oil comprises petroleum-based oil, and said composition is shaped to have a nominal thickness in the vicinity of about 0.01 to 0.6 inch.

16. The composition of claim 1, wherein said wax comprises petroleum-based wax, said oil comprises petroleum-based oil, said composition is shaped to have a nominal thickness in the vicinity of about 0.01 to 0.6 inch, and said glass microbeads are hollow.

17. The composition of claim 1, wherein said composition has wax and oil in a weight ratio of about 9.5 to 56.2 parts by weight of wax and about 90.5 to 43.8 parts by weight of oil, and about 1 part by weight of glass microbeads per about 0.7 to 9 parts by weight of both wax and oil.

18. The composition of claim 17, wherein said glass microbeads are hollow.

19. The composition of claim 1, wherein said composition has wax and oil in a weight ratio of about 13.8 to 31.2 parts by weight of wax and about 86.2 to 68.8 parts by weight of oil, and about 1 part by weight of glass microbeads per about 2.3 to 3.3 parts by weight of both wax and oil.

20. The composition of claim 19, wherein the glass microbeads are hollow and unicellular.

21. The composition of claim 1, wherein said composition has a specific gravity in the vicinity of about 0.2 to 0.8.

22. The composition of claim 1, wherein said composition has a specific gravity in the vicinity of about 0.3 to 0.6.

23. The composition of claim 1, wherein said resin microbeads are hollow.

24. The composition of claim 1, wherein said glass microbeads are hollow, and said resin microbeads are resilient, hollow and formed of vinylidene chloride-acrylonitrile copolymer.

25. A viscous, flowable, pressure-compensating fitting composition, which essentially consists of:

a major proportion by weight of a substantially homogeneous, substantially stable, viscous, flowable, continuous phase formed of the combination of wax and oil in a weight ratio of about 9.5 to 56.2 parts by weight of wax and about 90.5 to 43.8 parts by weight of oil, and in combination therewith, a minor proportion by weight of a discontinuous microbead phase of particles having about 1 part by weight of discrete, lightweight, sturdy, hollow, unicellular, glass microbeads per about 0.7 to 9 parts by weight of both wax and oil, said microbead phase being substantially uniformly distributed in and having a lower density than said continuous phase with the combination of wax and oil;

said glass microbeads being substantially uniformly distributed in said phase with wax and oil in combination with distributed, discrete, lightweight, sturdy, hollow, unicellular, resilient, resin microbeads which impart selected characteristics which are different than those associated with said glass microbeads;

said wax and oil phase being present in an amount sufficient (a) to more than merely thinly coat substantially the entire outer surface of essentially each of said microbeads or to more than merely form a film over the surface of essentially each of said microbeads, and (b) to provide a volume that is substantially more than the volume of the interstitial spaces of the quantity of microbeads alone;

said composition being characterized by being a viscous, flowable and thus deformable, and pressure-compensating composition, having a specific gravity in the vicinity of about 0.8, or less, having a substantially homogeneous consistency and not substantially changing in volume responsive to ambient temperatures or ambient temperature changes, being resistant to sag, flowing under shear stress after its yield point is reached, having a minimum yield point of at least about 4 gm./cm.$^2$, flowing in response and conformance to continuously applied pressure, and, when confined during conditions of use, being resistant to flow in response to instantaneously applied pressure, having resilient characteristics in that it is momentarily or slowly, at least in part, recoverable from deformation upon or following the relief of deforming pressure loads, and undergoing flow and deformation away from areas of highest pressure loads.

26. The composition of claim 25, wherein the density of the combination of wax and oil is about 0.5 to 1 gm./cc., the density of the glass microbeads is about 0.05 to 0.70 gm./cc., and the specific gravity of the composition is about 0.2 to 0.8.

27. The composition of claim 25, wherein the density of the combination of wax and oil is about 0.75 to 0.90 gm./cc., the density of the glass microbeads is about 0.15 to 0.30 gm./cc., and the specific gravity of the composition is about 0.3 to 0.6.

28. The composition of claim 25, wherein said composition has about 23 to 30.7% by weight of hollow, glass microbeads, about 10.2 to 21.25% by weight of wax, and about 46.8 to 63.75% by weight of oil.

29. The composition of claim 25, wherein said composition is characterized by having a penetrometer value, 5 sec. after dropping a cone under a 50-gm. load, in the vicinity of between 6 to 12 mm. at a temperature of $-20°$ F. and in the vicinity of between about 10 to 24 mm. at a temperature of 75° F.

30. The composition of claim 25, wherein said glass microbeads are microspheres.

31. The composition of claim 25, wherein said wax comprises petroleum-based wax.

32. The composition of claim 31, wherein said petroleum-based wax comprises microcrystalline wax.

33. The composition of claim 25, wherein said oil comprises petroleum-based oil.

34. The composition of claim 25, wherein said wax comprises petroleum-based wax and said oil comprises petroleum-based oil.

35. The composition of claim 25, wherein said composition is shaped to have a nominal thickness in the vicinity of about 0.01 to 0.6 inch.

36. The composition of claim 25, wherein said wax comprises petroleum-based wax, said oil comprises petroleum-based oil, and said composition is shaped to have a nominal thickness in the vicinity of about 0.01 to 0.6 inch.

37. The composition of claim 25, wherein said composition has wax and oil in a weight ratio of about 13.8 to 31.2 parts by weight of wax and about 86.2 to 68.8 parts by weight of oil, and about 1 part by weight of glass microbeads per about 2.3 to 3.3 parts by weight of both wax and oil.

38. The composition of claim 25, wherein said composition has a specific gravity in the vicinity of about 0.3 to 0.6

39. The composition of claim 25, wherein said resin microbeads are formed of vinylidene chloride-acrylonitrile copolymer.

* * * * *